United States Patent Office 2,717,265
Patented Sept. 6, 1955

2,717,265

SULFONATION OF MINERAL OIL

Herbert L. Johnson, Media, Pa., assignor to Sun Oil Company, Philadelphia, Pa., a corporation of New Jersey No Drawing. Application August 11, 1952,
Serial No. 303,841

4 Claims. (Cl. 260—504)

This invention relates to an improved manner of sulfonating mineral lubricating oil whereby increased yields of mahogany sulfonic acids are obtained.

In the sulfonation of mineral lubricating oil, the more desirable product generally is the mahogany, or oil-soluble, sulfonic acid product. Mahogany acids have important industrial applications including the use of their alkali metal salts as constituents of lubricating oil compositions and soluble oils, etc. The green acids formed, though useful in certain applications, are generally not as valuable as the mahogany acids. Green acids are those sulfonic acids which are insoluble in mineral oil and which exist in solid phase in the sulfonation products, or are dissolved in the aqueous phase, if any, of the sulfonation product mixture. Since the mahogany acids are the more valuable product, it is generally preferred to obtain a large yield of mahogany acids and also to obtain the largest possible ratio of mahogany acids to green acids in the sulfonation products.

Mahogany acids are principally or entirely formed by the sulfonation of aromatic constituents of the lubricating oil which is sulfonated.

The present invention provides an increased mahogany acid yield in sulfonation from mineral oil which contains a substantial amount of polynuclear aromatic compounds, i. e. of mineral oil whose aromatic fraction contains an average of at least 1.2 aromatic rings per molecule.

According to the present invention, such mineral oil is hydrogenated, prior to sulfonation, to provide a partial hydrogenation of aromatic constituents of the oil. The hydrogenation must be closely controlled if the advantageous increase in mahogany acid yield is to be obtained in the subsequent sulfonation. The hydrogenation must be extensive enough to provide a decrease in refractive index $N_d^{20}$ of the aromatic constituents of at least 0.005. Aromatic constituents, as contemplated here, are those constituents having at least one aromatic ring in their molecule. For purposes of test, these constituents can be separated from the remainder of the oil by selective adsorption on silica gel in a known manner, and the refractive index of the separated aromatic fraction can be determined in a known manner.

The hydrogenation, on the other hand, must not be so extensive as to provide a decrease in the aromatic content of the oil of more than 15 weight percent, based on the original aromatic content. Here again, the aromatics referred to are compounds having at least one aromatic ring in their molecule, and for purposes of test, the decrease in aromatic content can be determined by silica gel separation of aromatic constituents from samples of the oil before and after hydrogenation and comparison of the weight fractions of the separated aromatic constituents before and after hydrogenation.

Decrease in refractive index of the aromatic portion of the oil indicates substantial decrease in the average number of aromatic rings per molecule in the aromatic portion and may also, though not necessarily, indicate conversion of aromatic constituents of the oil into nonaromatic constituents. This is not necessarily the case, since a decrease in average number of aromatic rings per molecule can be obtained by conversion of polynuclear aromatic constituents to constituents having fewer aromatic nuclei, as well as by conversion of aromatic constituents to nonaromatic constituents. The decrease in refractive index in hydrogenation according to the present invention should be at least 0.005, and this may or may not, depending on the charge stock, be obtained concurrently with substantial decrease in the aromatic content of the oil. If a decrease in aromatic content of the oil does occur according to the invention, it should not be more than 15 weight percent, if the advantageous increase in mahogany acid yield is to be obtained in the subsequent sulfonation. The decrease in refractive index of the aromatic fraction, corresponding to a decrease of 15 percent in the aromatic content, varies with the charge stock and may be as great as 0.03. The hydrogenation according to the invention is preferably such as to provide a decrease in refractive index of the aromatic fraction within the range 0.0075 to 0.02.

It is believed that the hydrogenation according to the present invention selectively partially hydrogenates certain polynuclear aromatic compounds, which if not hydrogenated would not form mahogany acids upon sulfonation, and converts them into compounds which are still aromatic, but which have fewer aromatic rings per molecule and which are capable of forming mahogany acids upon sulfonation, by virtue of the partial hydrogenation of their molecules.

The increase in mahogany acid yield according to the invention is thus attributable to the selective formation, by hydrogenation, of aromatic compounds sulfonatable to form mahogany acids. The present invention can, in addition to an increased mahogany acid yield, produce a decreased green acid yield, which is probably attributable to the hydrogenation of aromatic compounds, which would ordinarily form green acids upon sulfonation, to form hydrogenated compounds which are either unsulfonatable or are sulfonatable to form mahogany acids.

The charge oil for the present invention may be any lubricating oil suitable as a sulfonation charge stock and having a substantial proportion of polynuclear aromatic constituents. This includes lubricating oils having S. U. viscosities at 100° F. within the range 200 to 2500. In cases where alkali metal soaps of the mahogany sulfonic acids produced are to be employed as emulsifying agent in soluble cutting oils, it is preferred that the average molecular weight of the aromatic fraction of the charge stock be within the range 300 to 400, in order to provide mahogany sulfonate products having average molecular weight within the range 380 to 480, as required for satisfactory use in soluble cutting oils, the latter being emulsifiable mineral oil compositions containing soaps, generally a mixture of sulfonates and naphthenates, as emulsifying agents.

According to the present invention, a charge stock as described above is hydrogenated under conditions to provide a decrease in refractive index of the aromatics of at least 0.005, and a decrease in aromatic content of the stock of not more than 15 percent. This represents a degree of hydrogenation controlled within narrow limits, but in the light of the present specification, a person skilled in the art can select hydrogenation conditions to obtain this result. Particularly suitable hydrogenation conditions involve the percolation of the charge stock through a stationary bed of hydrogenation catalyst at a temperature within the range 260° C. to 370° C., in the presence of a hydrogen-containing gas at a pressure within the range 500 to 2000 p. s. i. g., the charge stock space rate being within the approximate range 0.2 to 5.0 volumes of charge oil per volume of catalyst bed per hour. To obtain the required degree of hydrogenation, it is necessary to select the conditions very carefully from within the ranges specified, and when all but one condition has been set, the choice of that one condition is very much narrowed. Any suitable hydrogenation catalyst may be employed, e. g. molybdenum, chromium, tungsten, vanadium, zinc, tin, nickel, copper, iron, cobalt, etc., or their oxides or sulfides or other compounds, either alone or in combination with each other or with other compounds such as alkali metal or alkaline earth metal oxides or sulfides. The catalyst may, if desired, be supported on a suitable catalyst carrier, e. g. alumina, silica, activated carbon, etc.

The hydrogenated oil obtained as described is now, according to the invention, sulfonated to obtain a high yield of mahogany sulfonic acids. Any sulfonating agent suitable for sulfonation of aromatic compounds can be employed, e. g. sulfur trioxide, sulfuric acid, oleum, chlorosulfonic acid, etc.

Any suitable manner of contacting the hydrogenated oil with the sulfonating agent can be employed. Batch or continuous methods can be employed. The oil and sulfonating agent can be introduced separately into a contacting zone for admixture therein, or they can be premixed before introduction into the sulfonating zone. Where a gaseous sulfonating agent, e. g. sulfur trioxide is employed, a mixture of the agent with an inert carrier gas such as nitrogen or air, can be contacted with the oil to be sulfonated. The contacting and sulfonating zone can be provided by any suitable vessel, e. g. a horizontal cylindrical vessel through which the oil and sulfonating agent are pumped horizontally, or a vertically elongated vessel having in an upper portion thereof nozzles for discharge of oil and sulfonating agent into the vessel with provision of an outlet for sulfonation products from a lower portion of the vessel.

Any suitable sulfonation temperature can be employed. Generally, relatively high sulfonation temperatures, e. g. 180–300° F., favor the formation of sulfonic acids. The sulfonation reaction is rapidly exothermic, and the sulfonation charge can be introduced into the sulfonating zone at a temperature substantially below the desired sulfonation temperature, the temperature rising very rapidly to the desired temperature by virtue of the heat liberated. For example, a charge oil may be introduced into the sulfonating zone at 100° F. and rapidly rise in temperature to 200° F., so that it is at a relatively high temperature during most of its residence time in the contacting zone. Since relatively high sulfonation temperatures may advantageously be used according to the invention, it is generally not necessary or desirable to provide any external cooling of the sulfonation zone.

A solvent such as a dearomatized kerosene or petroleum naphtha may be used as a solvent in the sulfonation step to bring about better contact of the reactants and to bring about more rapid settling of green acids.

The sulfonation according to the invention is preferably carried out in such manner that not less than 10 percent and not more than 70 weight percent of the compounds in the sulfonation charge, which compounds contain an aromatic ring in the molecule, are sulfonated. Operation in this preferred manner provides a particularly high ratio of mahogany acids to green acids in the sulfonation products. In the light of the present specification, a person skilled in the art can determine the sulfonation conditions which will provide the desired degree of sulfonation. Particularly good conditions for providing the desired degree of sulfonation include the charging of oil and sulfonating agent to the sulfonation zone in a weight ratio of 1 to 20 parts, more preferably 5 to 15 parts of sulfonating agent ($SO_3$ equivalent) per 100 parts of sulfonation charge oil. When sulfur trioxide is employed as sulfonating agent, with inert carrier gas admixed, it is preferred that the mole percent of sulfur trioxide in the mixture be within the approximate range 2 to 50 percent, more preferably 5 to 30 percent.

The sulfonation products can be treated in any suitable manner. Generally, it is desirable to separate the green acid product from the oil product containing dissolved mahogany acids. Where a sulfonating agent containing water has been employed, this may be accomplished by separating the aqueous layer containing dissolved green acids from the oil layer. If any "pepper sludge," i. e. solid green acids, remains suspended in the oil layer, it may be removed in any suitable manner, e. g. by settling, either with or without previous addition of a low-viscosity solvent, e. g. pentane or petroleum naphtha. Where a water-free sulfonating agent such as sulfur trioxide has been employed, a removal of pepper sludge is generally all that is required.

The oil containing mahogany acids can be saponified and used directly as a soluble oil, or as a soluble oil constituent, or, after saponification, a sulfonate concentrate can be prepared by removal of oil, e. g. by solvent extraction with pentane or petroleum naphtha. Any other suitable treatment of the sulfonation products can be effected, e. g. known methods of preparing heavy metal sulfonates for use as lubricating oil additives. Oil removed from the sulfonate product can be recontacted if desired with sulfonating agent to produce additional mahogany sulfonic acids and green acids.

The hydrogenation according to the present invention is in itself capable of providing a highly satisfactory charge stock for sulfonation without any other pretreatment, but it is to be understood that the hydrogenation may be used in conjunction with some known method of pretreatment such as solvent refining. In cases where, according to the invention, hydrogenation is employed as sole pretreatment, an important advantage is obtained over prior art pretreating methods such as solvent extraction, in that the latter method results in the production of an extract material having little or no value, whereas the hydrogenation according to the invention results in a product which can be used in its entirety as sulfonation charge, there being no substantial byproduct corresponding to the solvent extract.

The following examples illustrate the invention:

Example I

In this example, a distillate lubricating oil containing 45.2 weight percent aromatic compounds (i. e. compounds containing an aromatic ring in their molecules as determined by known methods of analysis involving selective adsorption of such compounds on silica gel) was hydrogenated under conditions to provide a decrease of 0.0105 in refractive index of the aromatic portion of the oil, and to decrease the aromatic content to 42.5 percent. The hydrogenated oil was then sulfonated with oleum as sulfonating agent, and mahogany sulfonic acids and green sulfonic acids were separately recovered from the sulfonation products and their relative amounts determined. The yields of mahogany and green acids thus determined were compared with the yields of mahogany and green acids obtained by sulfonation under the same conditions of the same distillate lubricating oil without previous hydrogenation.

The properties of the distillate lubricating oil, which had been obtained from a naphthenic crude by topping the crude, saponifying the topped crude, and vacuum distilling the saponified topped crude to obtain the distillate, were as follows: viscosity at 100° F. of 475 centistokes, viscosity at 210° F. of 16.3 centistokes, aromatic content 45.2 percent, refractive index $N_d^{20}$ of 1.5216, specific gravity $d_4^{20}$ of 09.9436, average molecular weight of 397, average molecular weight of aromatic fraction 359, average number of naphthene rings per molecule 2.0, and average number of aromatic rings per molecule 1.8. The refractive index $N_d^{20}$ of the aromatic fraction of the distillate was 1.5623.

The hydrogenation catalyst employed was molybdenum sulfide on activated alumina, prepared by impregnating the alumina with a solution of ammonium molybdate $(NH_4)_6 Mo_7O_{24} \cdot H_2O$ in aqueous ammonia, drying the alumina, saturating with hydrogen sulfide, heating to 300° C. for four hours, and reducing with hydrogen.

The hydrogenation procedure was as follows: The charge oil was percolated in the presence of hydrogen through 100 ml. of the catalyst in a bed 8 inches high. The hydrogenation temperature was 360° C., the hydrogen pressure 1500 p. s. i. g., and the space rate 1 volume of oil per volume of catalyst bed per hour. The hydrogenation product had the following properties: viscosity at 100° F. of 295 centistokes, viscosity at 210° F. of 13.3 centistokes, aromatic content 42.5 percent, refractive index 1.5148, specific gravity 0.9354, average molecular weight 394, average molecular weight of aromatics 354. The refractive index of the aromatic fraction of the hydrogenated oil was 1.5518, indicating a decerase in refractive index of the aromatic fraction of 0.0105.

The sulfonation of the hydrogen product was conducted as follows: 2 parts by volume of the product were mixed with 1 part of dearomatized kerosene as diluent, and the mixture was contacted with 1 part of 108.5 percent sulfuric acid at 194° F., the sulfuric acid being added over a 25 minute period. The mixture of acid, charge, and diluent was agitated for an additional 5 minutes, and then allowed to stand in a separating zone for 1.5 hours, the oil and aqueous layers were separated, and green acids separated from the acid layer by diluting with an equal volume of water to coagulate the green acids, filtering the green acids, and washing with ligroin. Mahogany acids were separated from the oil layer by saponifying with a slight excess of 25 percent caustic soda at 127° F., adding 3 parts of 66% aqueous isopropanol per 2 parts of oil, separating the oil layer containing mahogany sulfonates, and evaporating water and alcohol from the latter layer to obtain deoiled mahogany sulfonates as residue.

The unhydrogenated lubricating oil distillate was sulfonated under the same conditions to provide a comparison. The following table shows the weight percents (based on the sulfonation charge) of mahogany acids and green acids obtained in sulfonation of the lubricating oil distillate, with and without previous hydrogenation:

|  | Mahogany Acids, Wt. Percent | Green Acids, Wt. Percent |
| --- | --- | --- |
| With Hydrogenation | 17.2 | 22.8 |
| Without Hydrogenation | 11.8 | 26.6 |

This example shows that a substantial increase in mahogany acid yield and a substantial decrease in green acid yield in sulfonation can be obtained by previous hydrogenation to a proper extent of the sulfonation charge stock.

*Example II*

In this example, the procedure of Example I was substantially duplicated, except that chlorosulfonic acid was used as the sulfonating agent instead of 108.5% sulfuric acid. The sulfonation procedure involving mixing 2 parts by weight of the same hydrogenated oil employed in Example I and 1 part of dearomatized kerosene, and adding 0.15 to 0.175 parts of chlorosulfonic acid over a half-hour period at 194° F. The following table shows the weight percents of mahogany and green acids obtained in sulfonation of the lubricating oil distillate, with and without previous hydrogenation:

|  | Mahogany Acids, Wt. Percent | Green Acids, Wt. Percent |
| --- | --- | --- |
| With Hydrogenation | 11.5 | 16.0 |
| Without Hydrogenation | 9.8 | 22.6 |

This example shows, with chlorosulfonic acid as sulfonating agent, a substantial increase in mahogany acid yield, and a large decrease in green acid yield.

The percent decrease in aromatic content during hydrogenation, according to the present invention, is based on the original aromatic content of the lubricating oil. Thus, in the preceding examples, the decrease from 45.2 percent to 42.5 percent represented a percent decrease, based on the original aromatic content of 45.2, of about 6 percent. The maximum decrease in aromatic content to obtain the advantages of the present invention is 15 percent, based on the original aromatic content, and particularly good results are obtained when the decrease in aromatic content is not more than 10 percent. Preferably, the initial aromatic content, prior to hydrogenation, of a mineral oil for use according to the invention, is at least 10 weight percent, more preferably at least 30 weight percent.

In the preceding example, the charge oil was a lubricating oil having viscosity at 100° F. of about 475 centistokes, i. e. about 2200 S. U. S. However, very much less viscous oils can be used as charge stocks, including lighter lubricating oils, transformer oils, etc. The process of the present invention can be advantageously used to obtain improved results in the sulfonation of relatively light oils for preparation of detergent intermediates, as well as in the sulfonation of relatively heavy oils for preparation of mahogany soaps for use in soluble oil and lubricating oil compositions.

The invention claimed is:

1. In a process for preparation by sulfonation, of mahogany sulfonic acids from a mineral oil having at least 1.2 aromatic rings per molecule in the aromatic portion thereof, the improvement which comprises: prior to said sulfonation, contacting said mineral oil in liquid phase with hydrogen under hydrogenation conditions to effect a decrease of at least 0.005 in the refractive index $N_d^{20}$ of the aromatic portion of the oil, and to effect a decrease of not more than 15 percent in the aromatic content of the oil.

2. Process according to claim 1 wherein said sulfonation is terminated before more than 70 weight percent of the aromatics in the charge to the sulfonation have been sulfonated.

3. Process according to claim 1 wherein said hydrogenation conditions comprise percolation of liquid oil through a solid hydrogenation catalyst bed at a temperature within the approximate range 260° C. to 370° C. and a pressure within the approximate range 500 to 2000 pounds per square inch gauge and at a space rate within the approximate range 0.2 to 5.0 volumes of oil per volume of catalyst bed per hour.

4. Process for preparation of alkali metal salts of mahogany sulfonic acids which comprises: contacting mineral oil having an average of at least 1.2 aromatic rings per molecule in the aromatic portion thereof in liquid phase with hydrogen under hydrogenation conditions to effect a decrease within the range 0.0075 to 0.02 in the refractive index $N_d^{20}$ of the aromatic portion of said oil and to effect a decrease of not more than 15 percent in the aromatic content of the oil, thereby to obtain a hydrogenated charge stock; contacting said hydrogenated charge stock with a sulfonating agent under sulfonation conditions to effect sulfonation of 10–70 weight percent of the aromatic compounds in said hydrogenated charge stock; and saponifying the sulfonation products to obtain alkali metal salts of mahogany sulfonic acids.

References Cited in the file of this patent

UNITED STATES PATENTS

| 1,999,738 | Pier et al. | Apr. 30, 1935 |
| 2,184,325 | Sweeney et al. | Dec. 26, 1936 |
| 2,413,311 | Cohen | Dec. 31, 1946 |
| 2,414,773 | Showalter | Jan. 21, 1947 |